(12) United States Patent
Teranishi

(10) Patent No.: US 12,449,640 B2
(45) Date of Patent: Oct. 21, 2025

(54) CAMERA OPTICAL LENS

(71) Applicant: AAC Optics (Suzhou) Co., Ltd., Suzhou (CN)

(72) Inventor: Takaaki Teranishi, Osaka (JP)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 782 days.

(21) Appl. No.: 17/741,490

(22) Filed: May 11, 2022

(65) Prior Publication Data

US 2023/0076657 A1    Mar. 9, 2023

(30) Foreign Application Priority Data

Aug. 31, 2021   (JP) ................. 2021-140766

(51) Int. Cl.
   *G02B 13/00*   (2006.01)
   *G02B 9/64*    (2006.01)

(52) U.S. Cl.
   CPC ........... *G02B 13/0045* (2013.01); *G02B 9/64* (2013.01)

(58) Field of Classification Search
   CPC ............ G02B 13/00; G02B 13/0045; G02B 13/0015; G02B 13/04; G02B 13/22; G02B 13/24; G02B 13/18; G02B 9/60; G02B 9/62; G02B 9/64; G02B 15/14; G02B 15/177; G02B 5/005; G02B 5/00; G02B 5/208; G02B 27/005; G02B 21/02
   USPC ........ 359/754–756, 708, 713, 751, 657, 682
   See application file for complete search history.

(56) References Cited

U.S. PATENT DOCUMENTS

| | | | |
|---|---|---|---|
| 2013/0242414 A1* | 9/2013 | Iwamoto | G02B 13/04 359/755 |
| 2014/0139931 A1* | 5/2014 | Kubota | G02B 9/60 359/740 |
| 2017/0184821 A1* | 6/2017 | Shi | G02B 9/64 |

* cited by examiner

*Primary Examiner* — Jie Lei
(74) *Attorney, Agent, or Firm* — Wiersch Law Group

(57) ABSTRACT

The present disclosure relates to a field of optical lens, and provides a camera optical lens including, from an object side to an image side in sequence, a first lens having negative refractive power, a second lens having positive refractive power, a third lens having positive refractive power, a fourth lens having negative refractive power, a fifth lens having negative refractive power, a sixth lens having positive refractive power and a seventh lens having negative refractive power; wherein the camera optical lens satisfies conditions of: $-55.00 \leq R1/d1 \leq -18.00$; $1.42 \leq f2/f \leq 1.96$; and $2.70 \leq f4/f1 \leq 10.10$. By adjusting the conditions, the camera lens has a suitable field angle for front lens and excellent optical performance.

5 Claims, 6 Drawing Sheets

CAMERA OPTICAL LENS

TECHNICAL FIELD

The present disclosure relates to a camera optical lens, particular, to a camera optical lens which is suitable for a front camera using imaging elements such as Charge Coupled Device (CCD) or Complementary Metal-Oxide Semiconductor Sensor (CMOS sensor) for high pixel, etc., and which has a suitable field angle and excellent optical performance, and includes seven lenses with a bright F number (FNO) less than 1.43.

BACKGROUND

In recent years, high accuracy of image recognition of objects (vehicle ahead, obstacles, centerlines, road signs, and the like) by a front camera is required for automatic driving. Therefore, in order to improve the accuracy of image recognition, it is a tendency to increase the size and the resolution of the sensor. In addition, in order to improve night recognition performance, a camera optical lens with a brighter FNO is required.

A camera optical lens with good optical performance is disclosed in embodiments of Japanese Patent Publication No. 2017-125978. The camera optical lens comprising, from an object side, a first lens having a positive refractive power, a second lens having a negative refractive power, a third lens having a negative refractive power, a fourth lens having a positive refractive power, and a fifth lens having a negative refractive power, a sixth lens having a positive refractive power and a seventh lens having a positive refractive power, and has good optical performance. However, due to insufficient relationships between the central curvature radius of the object-side surface of the first lens and center thickness of the first lens, between the focal length of the second lens and the focal length of the camera optical lens, between the focal length of the fourth lens and the focal length of the first lens, the camera optical lens becomes dark when the FNO is 1.90.

SUMMARY

An object of the present disclosure is to provide a camera optical lens having excellent optical performance with ultra thin, and including seven lenses with a bright FNO.

In order to achieve that aforementioned object, the present disclosure is conceived with a camera optical lens capable of solving the problem in the existing technology, by studying a camera optical lens including, from an object side to an image side in sequence, a first lens having negative refractive power, a second lens having positive refractive power, a third lens having positive refractive power, a fourth lens having negative refractive power, and a fifth lens having negative refractive power, a sixth lens having positive refractive power and a seventh lens having negative refractive power, as well as relationships between the central curvature radius of the object-side surface of the first lens and center thickness of the first lens, between the focal length of the second lens and the focal length of the camera optical lens, between the focal length of the fourth lens and the focal length of the first lens.

Embodiments of the present disclosure provide a camera optical lens. The camera optical lens includes, from an object side to an image side in sequence, a first lens having negative refractive power, a second lens having positive refractive power, a third lens having positive refractive power, a fourth lens having negative refractive power, and a fifth lens having negative refractive power, a sixth lens having positive refractive power and a seventh lens having negative refractive power; wherein the camera optical lens satisfies conditions of: $-55.00 \leq R1/d1 \leq -18.00$; $1.42 \leq f2/f \leq 1.96$; and $2.70 \leq f4/f1 \leq 10.10$; where R1 denotes a central curvature radius of an object-side surface of the first lens; d1 denotes an on-axis thickness of the first lens; f denotes a focal length of the camera optical lens; f2 denotes a focal length of the second lens; f1 denotes a focal length of the first lens; f4 denotes a focal length of the fourth lens.

As an improvement, the camera optical lens further satisfies a condition of: $-1.00 \leq R8/R9 \leq 11.20$, where; R8 denotes a central curvature radius of an image-side surface of the fourth lens; and R9 denotes a central curvature radius of an object-side surface of the fifth lens.

As an improvement, the camera optical lens further satisfies a condition of: $1.29 \leq R11/R12 \leq 2.16$; where R11 denotes a central curvature radius of an object-side surface of the sixth lens; and R12 denotes a central curvature radius of an image-side surface of the sixth lens.

As an improvement, the camera optical lens further satisfies a condition of: $-11.00 \leq f7/f \leq -1.45$; where f7 denotes a focal length of the seventh lens; and f denotes a focal length of the camera optical lens.

As an improvement, the first lens, the second lens, the third lens, the fourth lens, the fifth lens, the sixth lens and the seventh lens are made from glass material.

The present disclosure is advantageous in follows.

According to the present disclosure, the camera optical lens is provided, which is suitable for a front camera using imaging elements such as Charge Coupled Device (CCD) or Complementary Metal-Oxide Semiconductor Sensor (CMOS sensor) for high pixel, etc., and which has a suitable field angle and excellent optical performance, and includes seven lenses with a bright FNO.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

Figure 1:
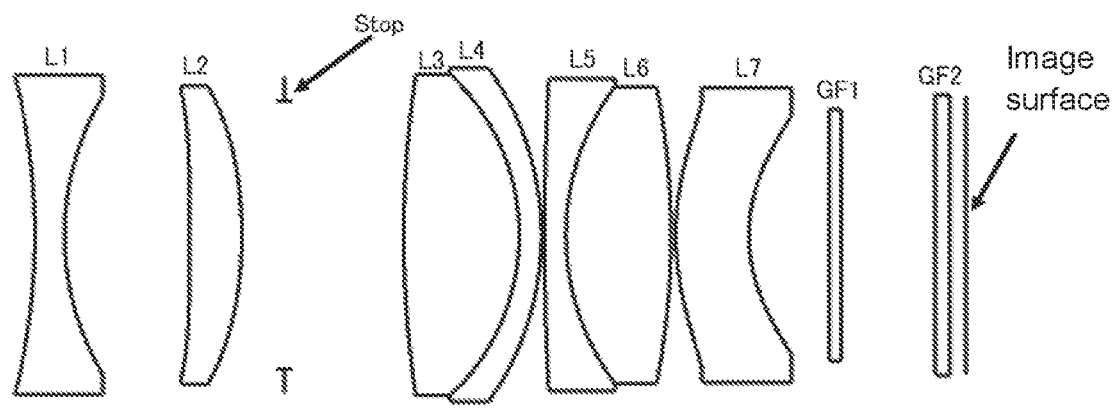
FIG. 1 is a schematic diagram of a structure of a camera optical lens LA according to Embodiment 1 of the present disclosure.

The present disclosure will be further described with reference to the accompanying drawings and embodiments. To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments of the camera optical lens will be described herein. The camera optical lens LA has a lens system including seven lenses, in which, from the object side to the image side in sequence, a first lens L1, a second lens L2, a third lens L3, a fourth lens L4, a fifth lens L5, a sixth lens L6 and a seventh lens L7 are provided. Glass plates GF are disposed between the seventh lens L7 and an image surface. The glass plates GF may include glass cover plates, various filters, and the like. In the present disclosure, the glass plates GF may be disposed at different positions or may be omitted. In addition, the first lens L1, the second lens L2, the third lens L3, the fourth lens L4, the fifth lens L5, the sixth lens L6 and the seventh lens L7 are also made from glass material.

The first lens L1 has a negative refractive power, the second lens L2 has a positive refractive power, the third lens L3 has a positive refractive power, the fourth lens L4 has a negative refractive power, the fifth lens L5 has a negative refractive power, the sixth lens L6 has a positive refractive power, and the seventh lens L7 has a negative refractive power. For batter correction to various distortions, it is desirable that surfaces of the third lens L3 and the seventh lens L7 are aspheric.

The camera optical lens LA satisfies a condition of:

$$-55.00 \leq R1/d1 \leq -18.00 \quad (1)$$

Condition (1) specifies a ratio of a central curvature radius R1 of an object-side surface of the first lens L1 to a on-axis thickness d1 of the first lens L1. Within this condition, correction to various aberrations is facilitated when the FNO is 1.43.

The camera optical lens LA satisfies a condition of:

$$1.42 \leq f2/f \leq 1.96 \quad (2)$$

Condition (2) specifies a ratio of a focal length f2 of the second lens L2 to a focal length f of the camera optical lens LA. Within this condition, correction to various aberrations is facilitated when the FNO is 1.43.

The camera optical lens LA satisfies a condition of:

$$2.70 \leq f4/f1 \leq 10.10 \quad (3)$$

Condition (3) specifies a ratio of a focal length f4 of the fourth lens L4 to a focal length f1 of the first lens L1. Within this condition, correction to various aberrations is facilitated when the FNO is 1.43.

The camera optical lens LA satisfies a condition of:

$$-1.00 \leq R8/R9 \leq 11.20 \quad (4)$$

Condition (4) specifies a ratio of a central curvature radius R8 of an object-side surface of the fifth lens L5 to a central curvature radius R9 of an image-side surface of the fifth lens L5. Within this condition, correction to various aberrations is facilitated when the FNO is 1.43.

The camera optical lens LA satisfies a condition of:

$$1.29 \leq R11/R12 \leq 2.16 \quad (5)$$

Condition (5) specifies a ratio of a central curvature radius R11 of an object-side surface of the seventh lens L7 and a central curvature radius R12 of an image-side surface of the seventh lens L7. Within this condition, correction to various aberrations is facilitated when the FNO is 1.43.

The camera optical lens LA satisfies a condition of:

$$-11.00 \leq f7/f \leq -1.45 \quad (6)$$

Condition (6) specifies a ratio of a focal length f7 of the seventh lens L7 and a focal length f of the camera optical lens LA. Within this condition, correction to various aberrations is facilitated when the FNO is 1.43.

With the seven lenses included in the camera optical lens LA satisfying the aforementioned structure and conditions respectively, the camera optical lens LA is obtained which is suitable for a front camera, has a suitable field angle and excellent optical performance and has a FNO less than 1.43.

EMBODIMENTS

The camera optical lens LA will be further described with reference to the following examples. Symbols used in various examples are shown as follows. It should be noted that the distance, central curvature radius, and on-axis thickness are all in units of millimeter (mm).

f: focal length of the camera optical lens LA;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
f7: focal length of the seventh lens L7;
FNO: F number (ratio of an effective focal length and an entrance pupil diameter of the camera optical lens);
2ω: full viewing angle;
STOP: aperture;
R: central curvature radius of an optical surface;
R1: central curvature radius of the object-side surface S1 of the first lens L1;
R2: central curvature radius of the image-side surface S2 of the first lens L1;
R3: central curvature radius of the object-side surface S3 of the second lens L2;

R4: central curvature radius of the image-side surface S4 of the second lens L2;
R5: central curvature radius of the object-side surface S5 of the third lens L3;
R6: central curvature radius of the image-side surface S6 of the third lens L3 and central curvature radius of the object-side surface S6 of the fourth lens L4;
R7: central curvature radius of the image-side surface S7 of the fourth lens L4;
R8: central curvature radius of the object-side surface S8 of the fifth lens L5;
R9: central curvature radius of the image-side surface S9 of the fifth lens L5 and central curvature radius of the object-side surface S9 of the sixth lens L6;
R10: central curvature radius of the image-side surface S10 of the sixth lens L6;
R11: central curvature radius of the object-side surface S11 of the seventh lens L7;
R12: central curvature radius of the image-side surface S12 of the seventh lens L7;
R13: central curvature radius of an object-side surface S13 of the glass plate GF1;
R14: central curvature radius of an image-side surface S14 of the glass plate GF1;
R15: central curvature radius of an object-side surface S15 of the glass plate GF2;
R16: central curvature radius of an image-side surface S16 of the glass plate GF2;
d: on-axis thickness of a lens or an on-axis distance between lenses;
d1: on-axis thickness of the first lens L1;
d2: on-axis distance from the image-side surface S2 of the first lens L1 to the object-side surface S3 of the second lens L2;
d3: on-axis thickness of the second lens L2;
d4: on-axis distance from the image-side S4 surface of the second lens L2 to the STOP;
d5: on-axis distance from the STOP to object-side surface S5 of the third lens L3;
d6: on-axis thickness of the third lens L3;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis thickness of the sixth lens L6;
d11: on-axis distance from the image-side surface of the sixth lens L6 to the object-side surface of the seventh lens L7;
d12: on-axis thickness of the seventh lens L7;
d13: on-axis distance from the image-side surface of the seventh lens L7 to the object-side surface of the glass plate GF1;
d14: on-axis thickness of the glass plate GF1;
d15: on-axis distance from the image-side surface of the glass plate GF1 to the object-side surface of the glass plate GF2;
d16: on-axis thickness of the glass plate GF2;
d17: on-axis distance from the image-side surface of the glass plate GF2 to the image surface;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
nd7: refractive index of the d line of the seventh lens L7;
nd8: refractive index of the d line of the glass plate GF1;
nd9: refractive index of the d line of the glass plate GF2;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the glass plate GF1;
v9: abbe number of the glass plate GF2;
TTL: total optical length of the camera optical lens (on-axis distance from the object-side surface of the first lens L1 to the image surface of the camera optical lens) in mm;
LB: on-axis distance from the image-side surface of the seventh lens L7 to the image surface (including the thicknesses of the glass plates GF);
IH: image high.

Embodiment 1

FIG. 1 is a schematic diagram of a structure of the camera optical lens LA according to Embodiment 1 of the present disclosure. Table 1 shows the central curvature radiuses R of the object-side surfaces and the image-side surfaces of the camera optical lens LA of the first lens L1 to the seventh lens L7, the on-axis thicknesses d of the lenses, the on-axis distances d between the lenses, the refractive indexes nd and the abbe numbers vd. Table 2 shows the conic coefficients k and the aspheric surface coefficients. Table 3 shows values of 2ω, Fno, f, f1, f2, f3, f4, f5, f6, f7, TTL, LB and IH.

TABLE 1

| | | R | d | | nd | | vd | Effective radius (mm) |
|---|---|---|---|---|---|---|---|---|
| S1 | R1 | −21.21013 | d1 | 1.000 | nd1 | 1.5168 | v1 64.20 | 5.240 |
| S2 | R2 | 9.21712 | d2 | 4.214 | | | | 4.560 |
| S3 | R3 | 1334.20589 | d3 | 1.797 | nd2 | 1.8062 | v2 40.91 | 4.753 |
| S4 | R4 | −13.93507 | d4 | 1.441 | | | | 4.904 |
| STOP | STOP | Infinity | d5 | 4.044 | | | | 4.530 |
| S5 | R5 | 36.31558 | d6 | 3.898 | nd3 | 1.4970 | v3 81.55 | 5.216 |
| S6 | R6 | −7.51041 | d7 | 0.750 | nd4 | 1.7888 | v4 28.43 | 5.288 |
| S7 | R7 | −9.83729 | d8 | 0.100 | | | | 5.523 |
| S8 | R8 | 94.31370 | d9 | 0.750 | nd5 | 1.7888 | v5 28.43 | 5.156 |
| S9 | R9 | 8.49507 | d10 | 3.547 | nd6 | 1.8160 | v6 46.62 | 4.877 |
| S10 | R10 | −25.81637 | d11 | 0.155 | | | | 4.674 |
| S11 | R11 | 9.18881 | d12 | 2.497 | nd7 | 1.6930 | v7 52.93 | 4.382 |
| S12 | R12 | 5.46502 | d13 | 2.707 | | | | 3.863 |

TABLE 1-continued

|  |  | R | d | nd | vd | Effective radius (mm) |
|---|---|---|---|---|---|---|
| S13 | R13 | Infinity | d14 0.400 | nd8 1.5168 | v8 64.20 | 4.036 |
| S14 | R14 | Infinity | d15 3.191 |  |  | 4.069 |
| S15 | R15 | Infinity | d16 0.500 | nd9 1.5168 | v9 64.20 | 4.467 |
| S16 | R16 | Infinity | d17 0.550 |  |  | 4.508 |

Reference wavelength = 588 nm

TABLE 2

| | Conic coefficient | Aspheric surface coefficients | | | |
|---|---|---|---|---|---|
| | k | A4 | A6 | A8 | A10 |
| R3 | −5.3113605E−01 | −4.2107345E−04 | −6.9731615E−06 | 1.1549888E−07 | 2.0080863E−09 |
| R4 | 0.0000000E+00 | −2.3102037E−04 | −6.4160340E−06 | 1.7943526E−07 | −1.6392336E−09 |
| R11 | −1.2427523E−02 | −4.9831571E−04 | −6.7817037E−08 | −1.1911453E−06 | 5.0151701E−08 |
| R12 | −6.5785585E−03 | −6.0498027E−04 | −3.4634122E−05 | −2.0940365E−07 | −1.2417232E−08 |

| | Conic coefficient | Aspheric surface coefficients | | |
|---|---|---|---|---|
| | k | A12 | A14 | A16 |
| R3 | −5.3113605E−01 | −3.6623246E−11 | 0.0000000E+00 | 0.0000000E+00 |
| R4 | 0.0000000E+00 | 3.6189266E−12 | −1.4070865E−13 | 0.0000000E+00 |
| R11 | −1.2427523E−02 | −8.0812494E−10 | −4.3578279E−13 | −2.2631205E−15 |
| R12 | −6.5785585E−03 | −1.0018680E−10 | −6.1758119E−12 | −7.2364914E−13 |

Herein, k denotes a conic coefficient, A4, A6, A8, A10, A12, A14 and A16 denote aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (7)$$

Herein, x denotes a vertical distance between a point in the aspheric curve and the optical axis, and y denotes an aspheric depth (i.e. a vertical distance between the point having a distance of x from the optical axis and a plane tangent to the vertex on the optical axis of the aspheric surface).

For convenience, an aspheric surface of each lens surface uses the aspheric surfaces shown in the above formula (7). However, the present disclosure is not limited to the aspherical polynomials form shown in the formula (7).

TABLE 3

| 2ω (°) | 60.7 |
|---|---|
| FNO | 1.43 |
| f (mm) | 8.747 |
| f1 (mm) | −12.306 |
| f2 (mm) | 17.117 |
| f3 (mm) | 12.902 |
| f4 (mm) | −46.927 |
| f5 (mm) | −11.883 |
| f6 (mm) | 8.215 |
| f7 (mm) | −26.822 |
| TTL (mm) | 31.541 |
| LB (mm) | 7.348 |
| IH (mm) | 4.626 |

In the subsequent Table 10, various parameters of Embodiments 1, 2 and 3 and values corresponding to the parameters specified in the above conditions (1) to (6) are shown.

As shown in Table 10, Embodiment 1 satisfies the conditions (1) to (6).

Figure 2:
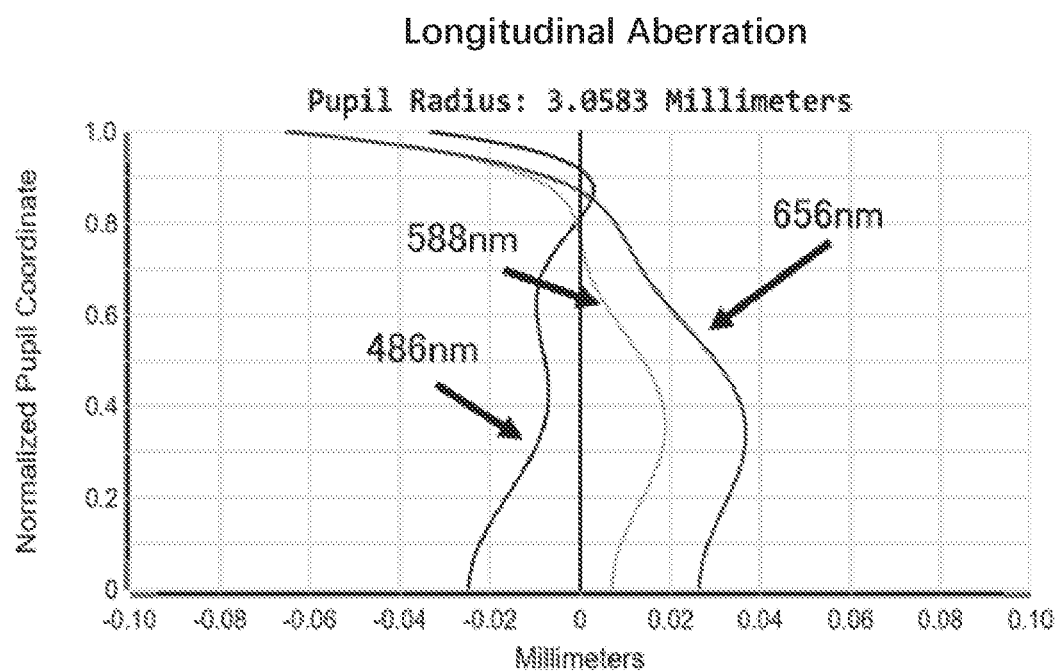
FIG. 2 is a schematic diagram of a longitudinal aberration of the camera optical lens LA according to Embodiment 1 of the present disclosure.
Figure 3:
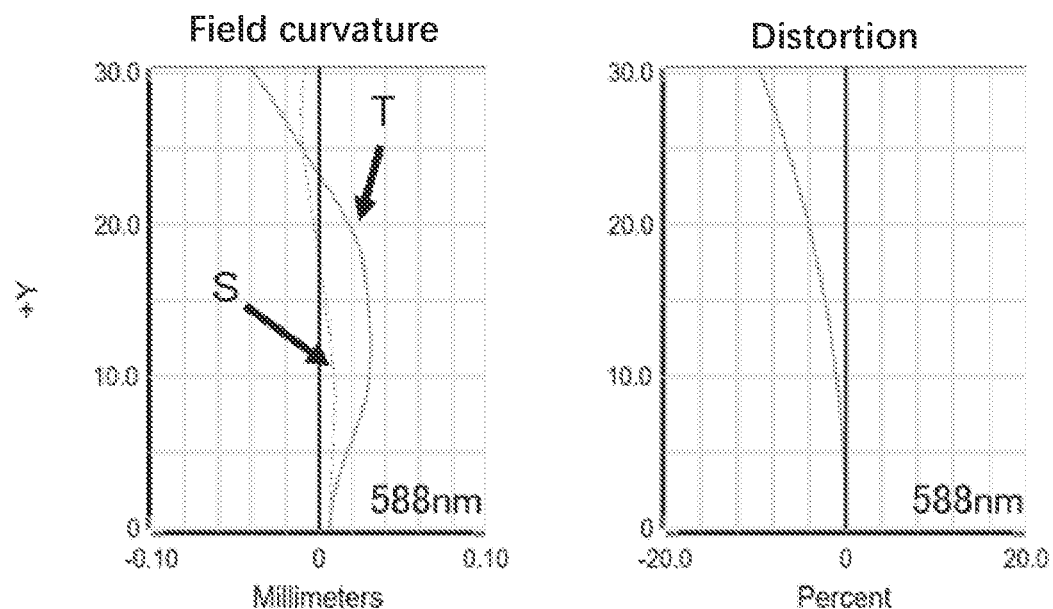
FIG. 3 is a schematic diagram of a field curvature and a distortion of the camera optical lens LA according to Embodiment 1 of the present disclosure.
Figure 4:
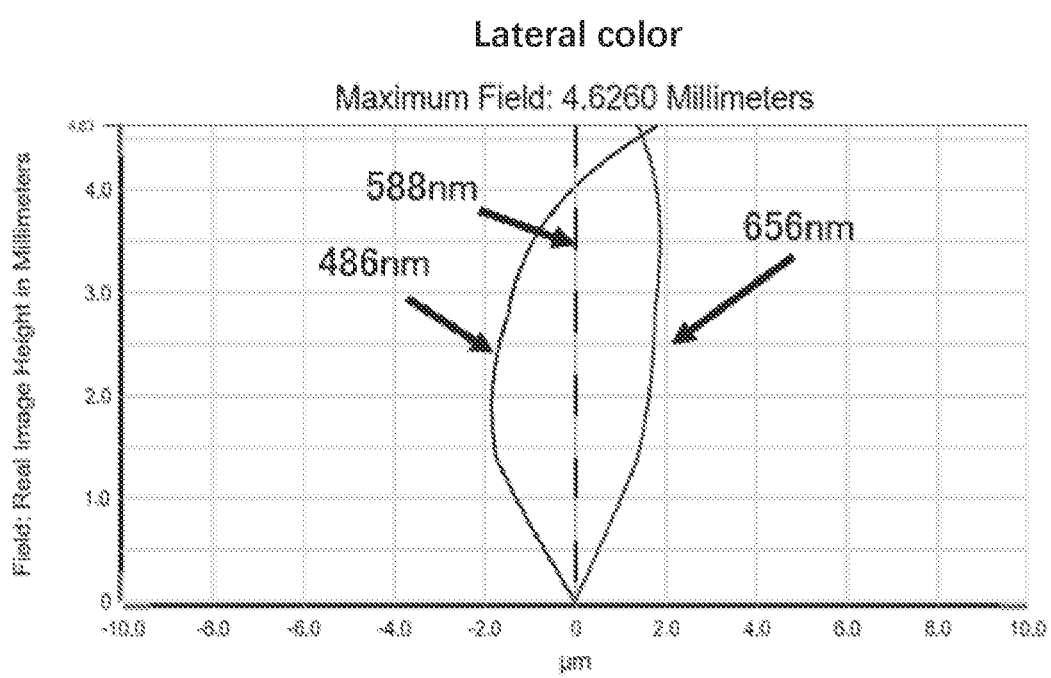
FIG. 4 is a schematic diagram of a lateral color of the camera optical lens LA according to Embodiment 1 of the present disclosure.

FIGS. 2 to 4 show a longitudinal aberration, a field curvature, a distortion and a lateral color of the camera optical lens LA according to Embodiment 1. A field curvature S in the drawings is a field curvature in a sagittal direction, and T is a field curvature in a tangential direction, which are also the same in Embodiments 2 and 3. It can be seen that the camera optical lens LA of Embodiment 1 becomes bright when FNO=1.43 as shown in Table 3, and has good optical performance as shown in FIGS. 2 to 4.

Embodiment 2

Figure 5:
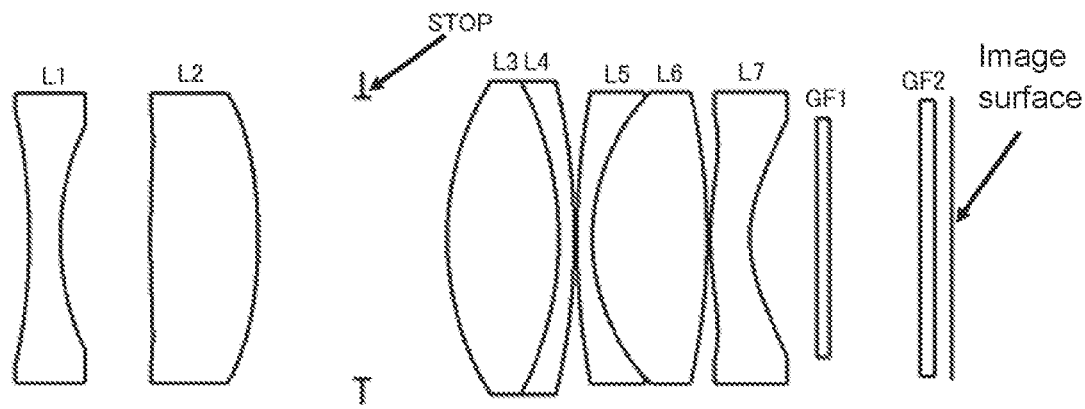
FIG. 5 is a schematic diagram of a structure of a camera optical lens LA according to Embodiment 2 of the present disclosure.

FIG. 5 is a schematic diagram of a structure of the camera optical lens LA according to Embodiment 2 of the present disclosure. Table 4 shows the central curvature radiuses R of the object-side surfaces and the image-side surfaces of the camera optical lens LA of the first lens L1 to the seventh lens L7, the on-axis thicknesses d of the lenses, the on-axis distances d between the lenses, the refractive indexes nd and the abbe numbers vd. Table 5 shows the conic coefficients k and the aspheric surface coefficients. Table 6 shows values of 2ω, Fno, f, f1, f2, f3, f4, f5, f6, f7, TTL, LB and IH.

TABLE 4

|  |  | R | d | nd |  | vd | Effective radius (mm) |
|---|---|---|---|---|---|---|---|
| S1 | R1 | −18.46520 | 0.998 | 1.5481 | nd1 v1 | 45.78 | 4.174 |
| S2 | R2 | 8.59874 | 2.964 |  |  |  | 3.629 |
| S3 | R3 | 42.98107 | 3.500 | 1.8062 | nd2 v2 | 40.91 | 4.164 |
| S4 | R4 | −15.60883 | 3.407 |  |  |  | 4.749 |
| STOP | STOP | Infinity | 2.771 |  |  |  | 4.599 |
| S5 | R5 | 9.89450 | 3.654 | 1.4970 | nd3 v3 | 81.55 | 5.132 |
| S6 | R6 | −11.12066 | 0.500 | 1.7888 | nd4 v4 | 28.43 | 5.132 |
| S7 | R7 | −22.21528 | 0.100 |  |  |  | 5.132 |
| S8 | R8 | 25.80698 | 0.500 | 1.7888 | nd5 v5 | 28.43 | 4.947 |
| S9 | R9 | 6.98348 | 3.753 | 1.8160 | nd6 v6 | 46.62 | 4.947 |
| S10 | R10 | −20.69446 | 0.100 |  |  |  | 4.947 |
| S11 | R11 | 9.24551 | 1.292 | 1.6930 | nd7 v7 | 52.93 | 4.002 |
| S12 | R12 | 4.29146 | 2.194 |  |  |  | 3.706 |
| S13 | R13 | Infinity | 0.400 | 1.5168 | nd8 v8 | 64.20 | 3.866 |
| S14 | R14 | Infinity | 2.960 |  |  |  | 3.914 |
| S15 | R15 | Infinity | 0.500 | 1.5168 | nd9 v9 | 64.20 | 4.458 |
| S16 | R16 | Infinity | 0.550 |  |  |  | 4.519 |

Reference wavelength = 588 nm

TABLE 5

| | Conic coefficient | Aspheric surface coefficients | | | |
|---|---|---|---|---|---|
| | k | A4 | A6 | A8 | A10 |
| R3 | 0.0000000E+00 | −4.1819422E−04 | −7.5283287E−06 | −9.1982304E−09 | −1.9021301E−08 |
| R4 | 0.0000000E+00 | −3.2861488E−04 | −5.2631022E−06 | −3.9046962E−08 | −7.7596891E−10 |
| R11 | 0.0000000E+00 | −3.3564302E−03 | −1.9532312E−05 | 5.6389325E−06 | −1.8127486E−07 |
| R12 | 0.0000000E+00 | −4.7077616E−03 | −2.8475151E−05 | −1.1213061E−06 | 1.4458535E−06 |

| | Conic coefficient | Aspheric surface coefficients | | |
|---|---|---|---|---|
| | k | A12 | A14 | A16 |
| R3 | 0.0000000E+00 | 8.2965064E−10 | −2.3464025E−11 | 0.0000000E+00 |
| R4 | 0.0000000E+00 | −5.4353054E−11 | −1.0459621E−13 | 0.0000000E+00 |
| R11 | 0.0000000E+00 | −1.1239438E−08 | 1.0814989E−09 | −2.4777305E−11 |
| R12 | 0.0000000E+00 | −2.4194129E−07 | 1.5389787E−08 | −3.8569471E−10 |

TABLE 6

| | |
|---|---|
| 2ω(°) | 61.1 |
| FNO | 1.43 |
| f (mm) | 8.758 |
| f1 (mm) | −10.566 |
| f2 (mm) | 14.593 |
| f3 (mm) | 11.180 |
| f4 (mm) | −28.805 |
| f5 (mm) | −12.283 |
| f6 (mm) | 6.815 |
| f7 (mm) | −12.939 |
| TTL (mm) | 30.143 |
| LB (mm) | 6.604 |
| IH (mm) | 4.626 |

As shown in Table 10, Embodiment 2 satisfies the conditions (1) to (6).

Figure 6:
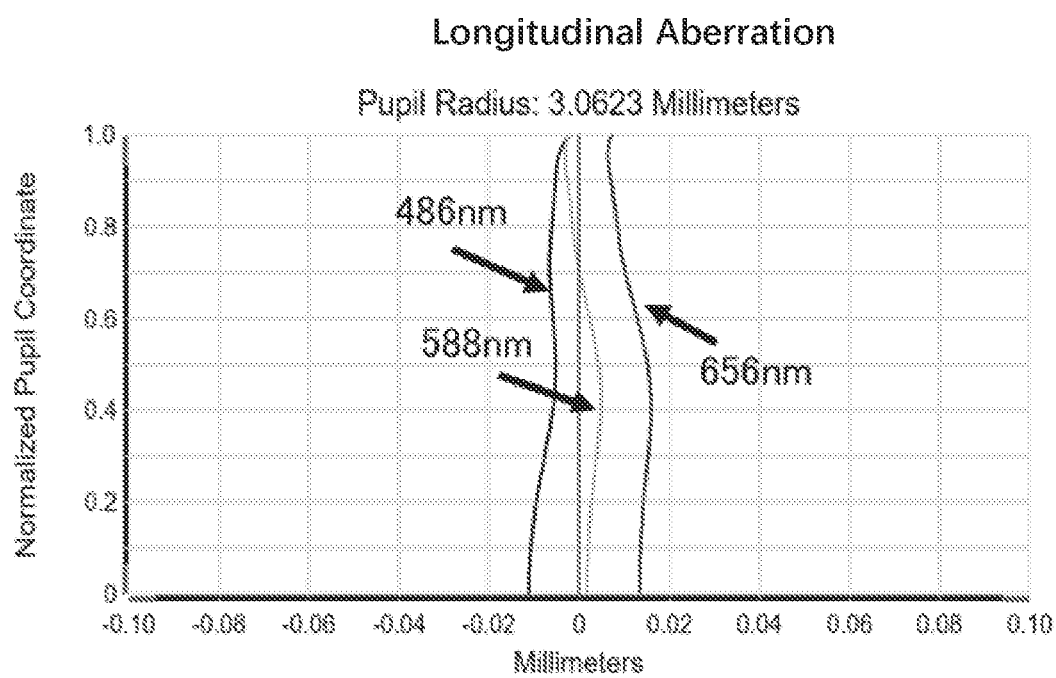
FIG. 6 is a schematic diagram of a longitudinal aberration of the camera optical lens LA according to Embodiment 2 of the present disclosure.
Figure 7:
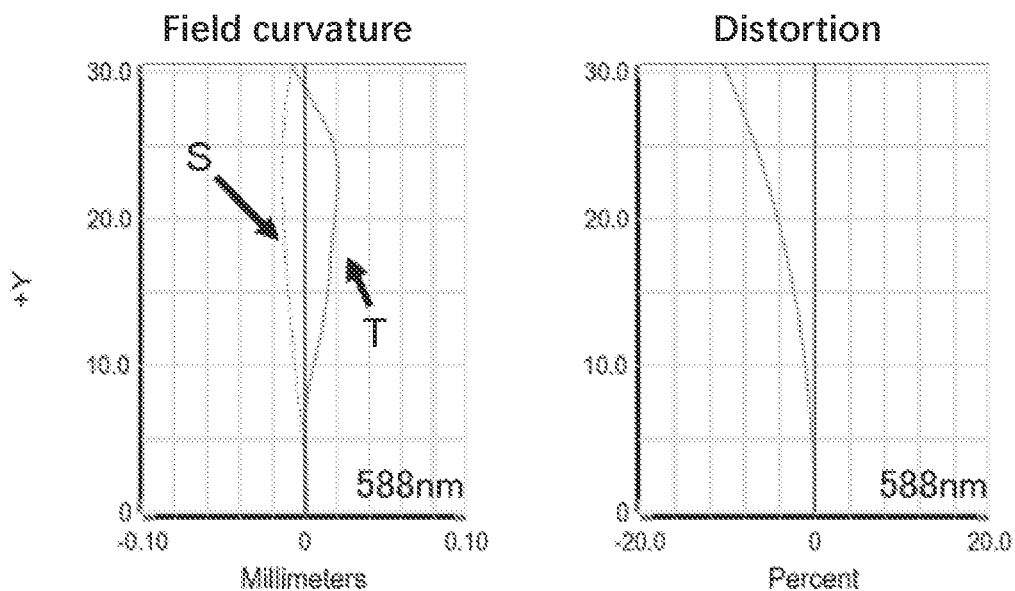
FIG. 7 is a schematic diagram of a field curvature and a distortion of the camera optical lens LA according to Embodiment 2 of the present disclosure.
Figure 8:
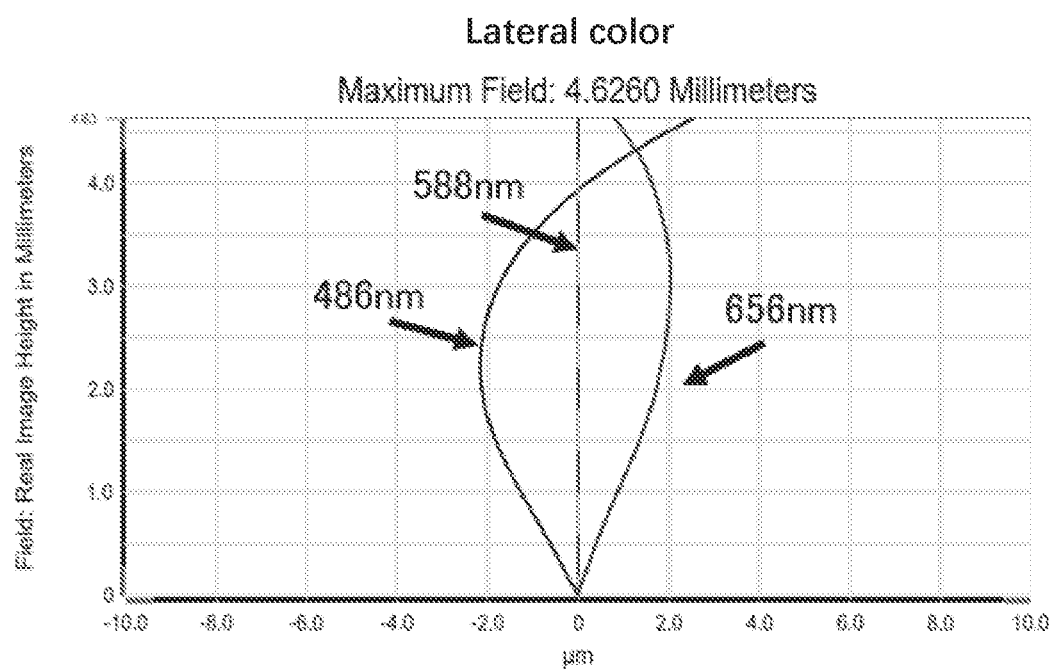
FIG. 8 is a schematic diagram of a lateral color of the camera optical lens LA according to Embodiment 2 of the present disclosure.

FIGS. 6 to 8 show a longitudinal aberration, a field curvature, a distortion and a lateral color of the camera optical lens LA according to Embodiment 2. It can be seen that the camera optical lens LA of Embodiment 2 becomes bright when FNO=1.43 as shown in Table 6, and has good optical performance as shown in FIGS. 6 to 8.

Embodiment 3

Figure 9:
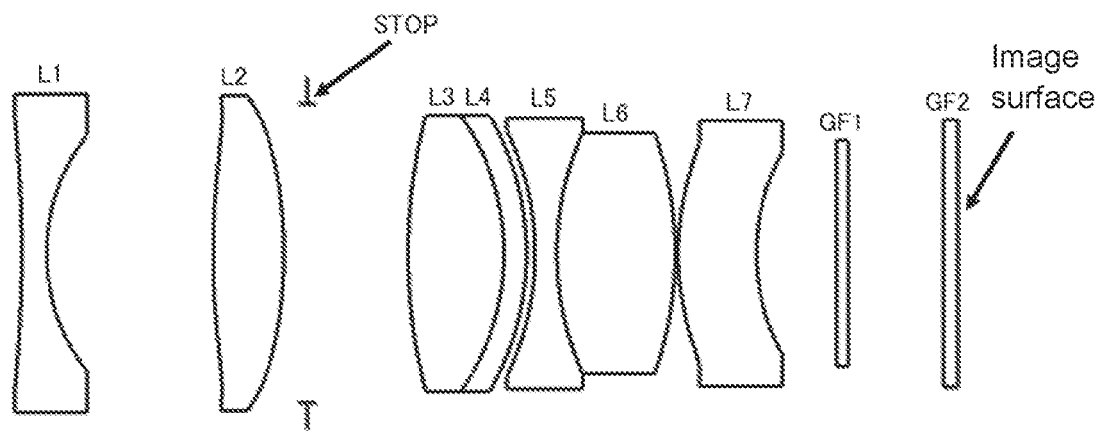
FIG. 9 is a schematic diagram of a structure of a camera optical lens LA according to Embodiment 3 of the present disclosure.

FIG. 9 is a schematic diagram of a structure of the camera optical lens LA according to Embodiment 3 of the present disclosure. Table 7 shows the central curvature radiuses R of the object-side surfaces and the image-side surfaces of the camera optical lens LA of the first lens L1 to the seventh lens L7, the on-axis thicknesses d of the lenses, the on-axis distances d between the lenses, the refractive indexes nd and the abbe numbers vd. Table 8 shows the conic coefficients k and the aspheric surface coefficients. Table 9 shows values of 2ω, Fno, f, f1, f2, f3, f4, f5, f6, f7, TTL, LB and IH.

TABLE 7

| | | R | d | nd | vd | Effective radius (mm) |
|---|---|---|---|---|---|---|
| S1 | R1 | −46.41000 | d1 0.850 | nd1 1.5710 | v1 50.80 | 4.714 |
| S2 | R2 | 6.55795 | d2 5.638 | | | 4.005 |
| S3 | R3 | 22.51701 | d3 2.402 | nd2 1.8062 | v2 40.91 | 5.118 |
| S4 | R4 | −16.28053 | d4 0.790 | | | 5.340 |
| STOP | STOP | Infinity | d5 3.410 | | | 5.060 |
| S5 | R5 | 18.67790 | d6 3.258 | nd3 1.4970 | v3 81.55 | 4.666 |
| S6 | R6 | −8.16992 | d7 0.750 | nd4 1.7888 | v4 28.43 | 4.464 |
| S7 | R7 | −9.48060 | d8 0.290 | | | 4.451 |
| S8 | R8 | −9.61268 | d9 0.750 | nd5 1.7888 | v5 28.43 | 4.184 |
| S9 | R9 | 10.02255 | d10 4.005 | nd6 1.8160 | v6 46.62 | 4.081 |
| S10 | R10 | −12.44593 | d11 0.100 | | | 4.002 |
| S11 | R11 | 9.32415 | d12 2.652 | nd7 1.6930 | v7 52.93 | 3.708 |
| S12 | R12 | 7.18184 | d13 2.707 | | | 3.343 |
| S13 | R13 | Infinity | d14 0.400 | nd8 1.5168 | v8 64.20 | 3.706 |
| S14 | R14 | Infinity | d15 3.225 | | | 3.761 |
| S15 | R15 | Infinity | d16 0.500 | nd9 1.5168 | v9 64.20 | 4.443 |
| S16 | R16 | Infinity | d17 0.550 | | | 4.512 |

Reference wavelength = 588 nm

TABLE 8

| | Conic coefficient | Aspheric surface coefficients | | | |
|---|---|---|---|---|---|
| | k | A4 | A6 | A8 | A10 |
| R3 | 0.0000000E+00 | −2.5214326E−04 | −4.5973696E−07 | −4.0995636E−07 | 1.5382467E−08 |
| R4 | 0.0000000E+00 | −2.2037489E−04 | −3.3178477E−06 | −3.6883093E−08 | −2.7560032E−09 |
| R11 | 0.0000000E+00 | −1.7434616E−04 | −3.4264171E−05 | 1.1123196E−05 | −2.3077836E−06 |
| R12 | 0.0000000E+00 | 2.5017010E−04 | 6.8482079E−05 | −3.0647236E−05 | 5.7059095E−06 |

| | Conic coefficient | Aspheric surface coefficients | | |
|---|---|---|---|---|
| | k | A12 | A14 | A16 |
| R3 | 0.0000000E+00 | −3.6913561E−10 | 0.0000000E+00 | 0.0000000E+00 |
| R4 | 0.0000000E+00 | −2.5144417E−11 | 3.1084308E−12 | −1.1517492E−13 |
| R11 | 0.0000000E+00 | 2.3751230E−07 | −1.2310838E−08 | 2.5431801E−10 |
| R12 | 0.0000000E+00 | −6.0091107E−07 | 3.2022198E−08 | −6.6527674E−10 |

TABLE 9

| | |
|---|---|
| 2ω(°) | 60.1 |
| FNO | 1.43 |
| f (mm) | 8.469 |
| f1 (mm) | −10.005 |
| f2 (mm) | 12.054 |
| f3 (mm) | 11.916 |
| f4 (mm) | −100.212 |
| f5 (mm) | −6.118 |
| f6 (mm) | 7.397 |
| f7 (mm) | −91.429 |
| TTL (mm) | 32.278 |
| LB (mm) | 7.382 |
| IH (mm) | 4.626 |

As shown in Table 10, Embodiment 3 satisfies the conditions (1) to (6).

Figure 10:
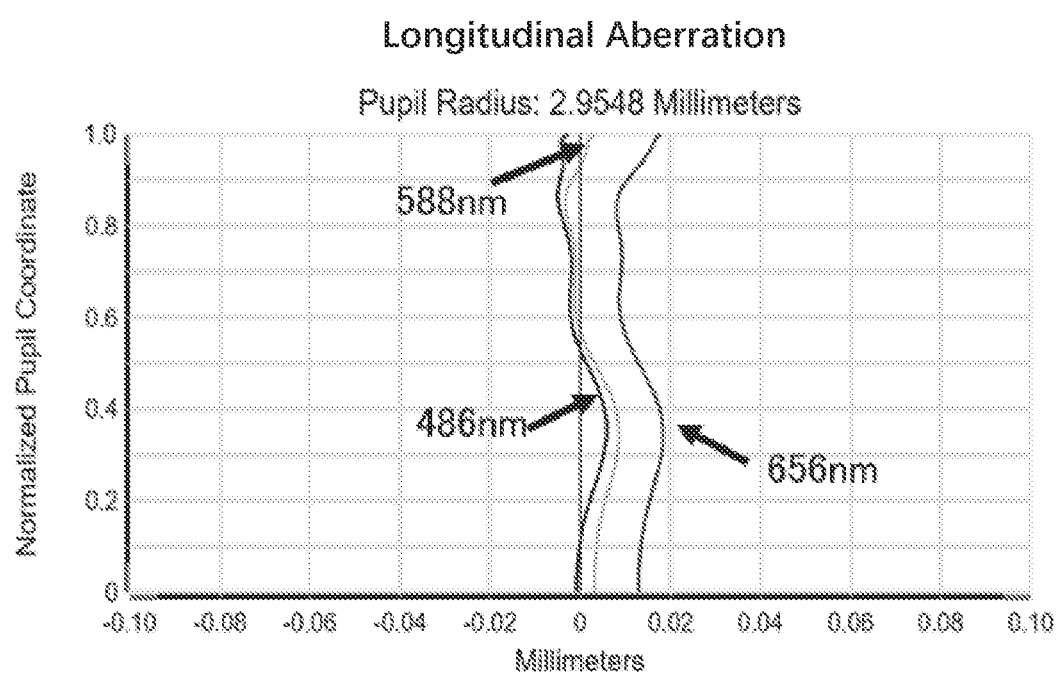
FIG. 10 is a schematic diagram of a longitudinal aberration of the camera optical lens LA according to Embodiment 3 of the present disclosure.
Figure 11:
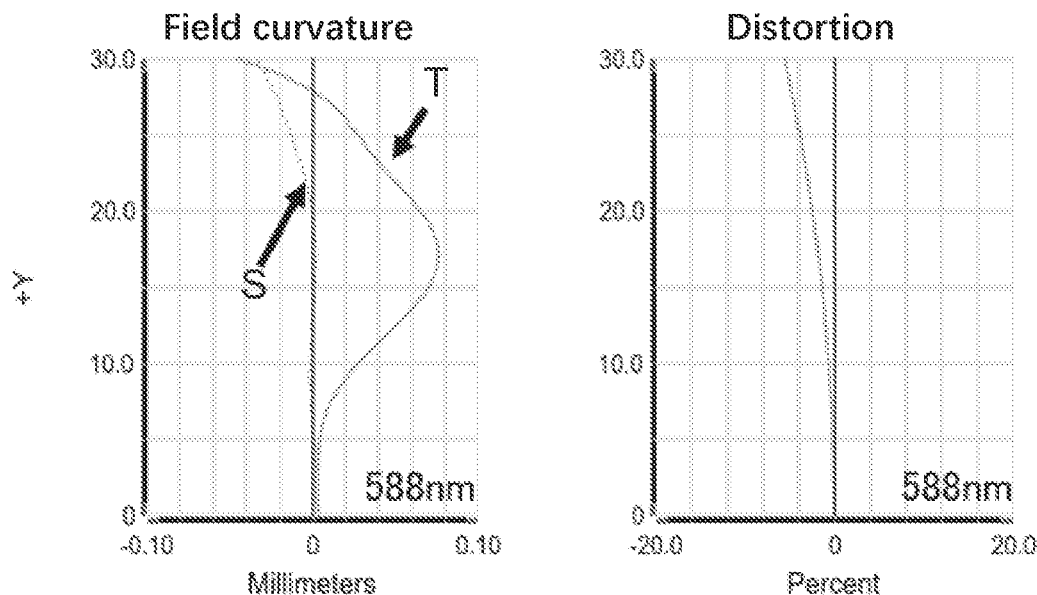
FIG. 11 is a schematic diagram of a field curvature and a distortion of the camera optical lens LA according to Embodiment 3 of the present disclosure.
Figure 12:
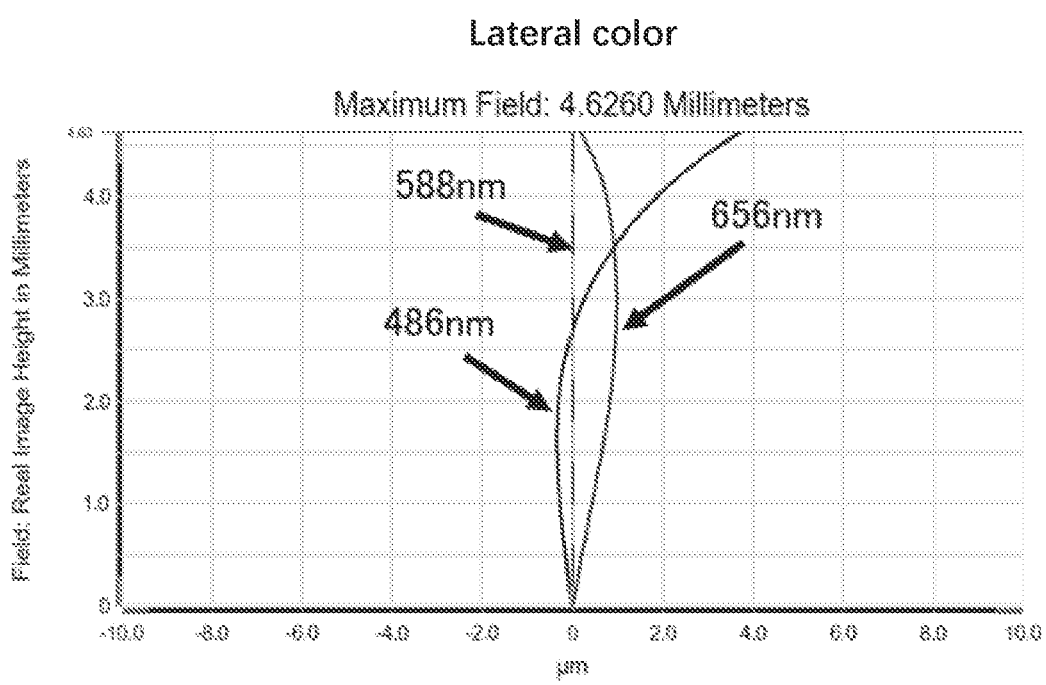
FIG. 12 is a schematic diagram of a lateral color of the camera optical lens LA according to Embodiment 3 of the present disclosure.

FIGS. 10 to 12 show a longitudinal aberration, a field curvature, a distortion and a lateral color of the camera optical lens LA according to Embodiment 3. It can be seen that the camera optical lens LA of Embodiment 3 becomes bright when FNO=1.43 as shown in Table 9, and has good optical performance as shown in FIGS. 10 to 12.

TABLE 10

| | Embodiment 1 | Embodiment 2 | Embodiment 3 | Conditions |
|---|---|---|---|---|
| R1/d1 | −21.270 | −18.500 | −54.600 | (1) |
| f2/f | 1.957 | 1.666 | 1.423 | (2) |
| f4/f1 | 3.813 | 2.726 | 10.016 | (3) |
| R8/R9 | 11.102 | 3.695 | −0.959 | (4) |
| R11/R12 | 1.681 | 2.154 | 1.298 | (5) |
| f7/f | −3.066 | −1.477 | −10.796 | (6) |

It will be understood by those of ordinary skill in the art that the embodiments described above are specific embodiments realizing the present disclosure, and that in practical applications, various changes may be made thereto in form and in detail without departing from the range and scope of the disclosure.

What is claimed is:

1. A camera optical lens comprising, from an object side to an image side in sequence, a first lens having negative refractive power, a second lens having positive refractive power, a third lens having positive refractive power, a fourth lens having negative refractive power, a fifth lens having negative refractive power, a sixth lens having positive refractive power and a seventh lens having negative refractive power; wherein the camera optical lens satisfies conditions of:

$-21.27 \leq R1/d1 \leq -18.00;$ $1.42 \leq f2/f \leq 1.96;$ and $2.70 \leq f4/f1 \leq 10.10;$ where f denotes a focal length of the camera optical lens;
f1 denotes a focal length of the first lens;
f2 denotes a focal length of the second lens;
f4 denotes a focal length of the fourth lens;
R1 denotes a central curvature radius of an object-side surface of the first lens;
d1 denotes an on-axis thickness of the first lens.

2. The camera optical lens according to claim 1, wherein the camera optical lens further satisfies a condition of:

$-1.00 \leq R8/R9 \leq 11.20;$ where

R8 denotes a central curvature radius of an object-side surface of the fifth lens;
R9 denotes a central curvature radius of an image-side surface of the fifth lens.

3. The camera optical lens according to claim 1, wherein the camera optical lens further satisfies a condition of:

$1.29 \leq R11/R12 \leq 2.16;$ where

R11 denotes a central curvature radius of an object-side surface of the seventh lens;
R12 denotes a central curvature radius of an image-side surface of the seventh lens.

4. The camera optical lens according to claim 1, wherein the camera optical lens further satisfies a condition of:

$-11.00 \leq f7/f \leq -1.45;$ where f7 denotes a focal length of the seventh lens.

5. The camera optical lens according to claim 1, wherein the first lens, the second lens, the third lens, the fourth lens, the fifth lens, the sixth lens and the seventh lens are made from glass materials.

* * * * *